United States Patent [19]
Spirk

[11] Patent Number: 5,196,751
[45] Date of Patent: Mar. 23, 1993

[54] LARGE-DIAMETER A.C. MOTOR WITH JOINTS IN THE STATOR

[75] Inventor: Franz Spirk, Berlin, Fed. Rep. of Germany

[73] Assignee: Siemens Aktiengesellschaft, Munich, Fed. Rep. of Germany

[21] Appl. No.: 768,716
[22] PCT Filed: Jul. 6, 1989
[86] PCT No.: PCT/DE89/00452
  § 371 Date: Dec. 30, 1991
  § 102(e) Date: Dec. 30, 1991
[87] PCT Pub. No.: WO90/13935
  PCT Pub. Date: Nov. 15, 1990

[30] Foreign Application Priority Data

Apr. 28, 1989 [DE] Fed. Rep. of Germany ....... 3914731

[51] Int. Cl.⁵ .............................. H02K 1/12
[52] U.S. Cl. .................. 310/254; 310/67 R; 310/203; 310/214; 310/216; 310/259
[58] Field of Search ............ 310/254, 259, 67 R, 310/179, 184, 203, 205, 214, 42, 261, 234, 68 A, 68 E, 206, 68 R, 71, 216

[56] References Cited

U.S. PATENT DOCUMENTS 3,221,195 11/1965 Hoffmann ............. 310/179
3,515,919 6/1970 Houtman ............. 310/184
3,888,552 6/1975 Wehde ............. 310/154
4,594,523 6/1986 Horita ............. 310/42
4,600,864 7/1986 Sato ............. 310/254

FOREIGN PATENT DOCUMENTS 0713640 11/1941 Fed. Rep. of Germany.
0761310 3/1954 Fed. Rep. of Germany.
0749484 4/1954 Fed. Rep. of Germany.
1556113 1/1969 France.
2098931 3/1972 France.
0230334 10/1987 Japan.
0488312 5/1970 Switzerland.

Primary Examiner—R. Skudy
Attorney, Agent, or Firm—Kenyon & Kenyon

[57] ABSTRACT

In a large-diameter a.c. motor, the stator is divided by joints (6). The stator coil (5) consists of windings (4) which are arranged in two layers in the grooves of the stator. In order to simplify assembly of the machine, the stator coil (5) is divided into several zones (7) of closed windings (4) corresponding to the number of joints (6), which lie only in the grooves located between the joints. In the grooves adjacent to the joint (6), occupied with a winding side (8) in only one layer, the air gap is larger. Such a large-diameter a.c. motor, of synchronous or asynchronous design, can be advantageously used for variable-speed applications, for which the stator coil is supplied with current of varying frequency.

7 Claims, 2 Drawing Sheets

LARGE-DIAMETER A.C. MOTOR WITH JOINTS IN THE STATOR

BACKGROUND OF THE INVENTION

The present invention relates to a large-diameter a.c. motor with a stator having joints. The stator carries a stator coil formed of windings which are arranged in two layers and disposed in grooves. The stator also has switching connections extending over its circumference, in which the stator coil is divided into several zones of closed windings. These zones correspond to the number of joints. The closed windings lie only in the groves between the joints.

Such divisible stators of large-circumference a.c. motors, especially of a synchronous design, are known. Due of the special structure of the stator coils described in DE-C-761 310, to simplify assembly of the a.c. motor at the installation site, the joints are not covered by windings. Only the switching connections are passed over the joint, and can be connected with each other at the joint such that they can be released, in known manner. In an a.c. motor with such a construction, each of the grooves of the stator adjacent to the joint is only occupied with one winding layer.

The armature reaction changes at the one-layer arrangement of the winding sides in the grooves adjacent to the joint. The present invention seeks to reduce the resulting disadvantages in the operation of such a machine.

SUMMARY OF THE INVENTION

To accomplish this task, according to the present invention, in an a.c. motor of the type described, initially the air gap is larger in the grooves adjacent to the joint. The closed windings have only one winding side. As a result, the lack of armature reaction in this area is compensated, at least in part. In particular, the occurrence of force waves of various magnitudes can be reduced at rated current operation.

The armature reaction changes at the one-layer arrangement of the winding sides in the grooves adjacent to the joint. It is desirable that the air gap is larger at the area where the grooves adjacent to the joint have only one winding side than at the area where the grooves have a two-layer arrangement of winding sides. As a result, the lack of armature reaction in this area is compensated, at least in part. In particular, the occurrence of force waves of various magnitudes can be reduced at rated current operation.

The enlargement of the air gap in the vicinity of the joint can be constant or can increase, continuously or in steps, in the direction of the joint. Thus, certain force waves magnetically caused by the local, lack of armature reaction can be influenced in a predetermined manner.

Furthermore, it is especially advantageous to use such a stator coil which leaves the joints free, with a.c. motors supplied with current of variable frequency because the magnetic force effects can be minimized by means of the free selection of the pole pair number given for sizing of the machine.

It is furthermore advantageous to mechanically reinforce; the stator coils by means of filler pieces. Each of the stator grooves occupied by only one winding layer can be filled with such filler pieces.

Furthermore, it is especially advantageous to use a stator coil which leaves the joints free, with a.c. motors which are supplied with current of variable frequency because the magnetic force effects can be minimized by means of the free selection of the pole pair number given for sizing of the machine.

It is furthermore recommended to undertake mechanical reinforcement of the stator coils by means of filler pieces, with Which the stator grooves occupied by only one winding layer can be filled in each case.

In the following, the invention is explained in greater detail on the basis of the embodiment shown in FIGS. 1 and 2; however, the invention is not limited to this embodiment.

DETAILED DESCRIPTION

Figure 1:
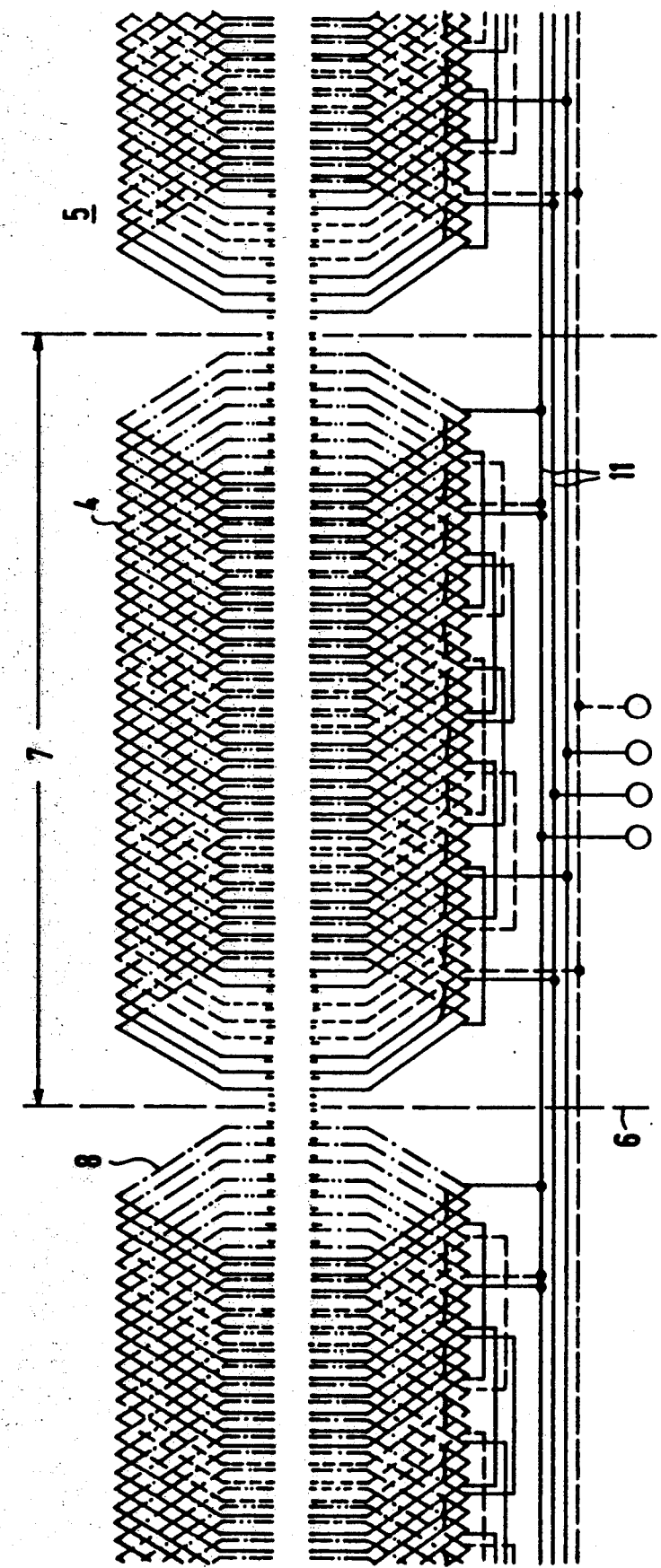
FIG. 1 shows a cut-out of the wiring diagram of the stator coil of an a.c. motor with joints.

A large-diameter a.c. motor is structured as an external rotor motor and is operated at varying rpm's, by a means such as frequency converter. The stator 1 lies on the inside and is layered from uniformly grooved sheet-metal segments 2. The windings 4 of the stator coil 5 lie in each of the grooves 3 of the sheet-metal segments 2 in each case. Since the a.c. motor has a large diameter, the stator 1 is structured to be divisible, i.e., it has several joints 6 (only indicated with broken lines in FIG. 1).

The stator coil 5 is divided into a plurality of zones 7, indicated with arrows in FIG. 1. Each of the zones extend between the joints 6. In each of these zones 7, the stator coil 5 contains a certain number of closed windings 4. The closed windings lie only in the grooves 3 located between the joints 6. Thus, the joint 6 is not bridged by windings 4 of the stator coil 5.

Figure 2:
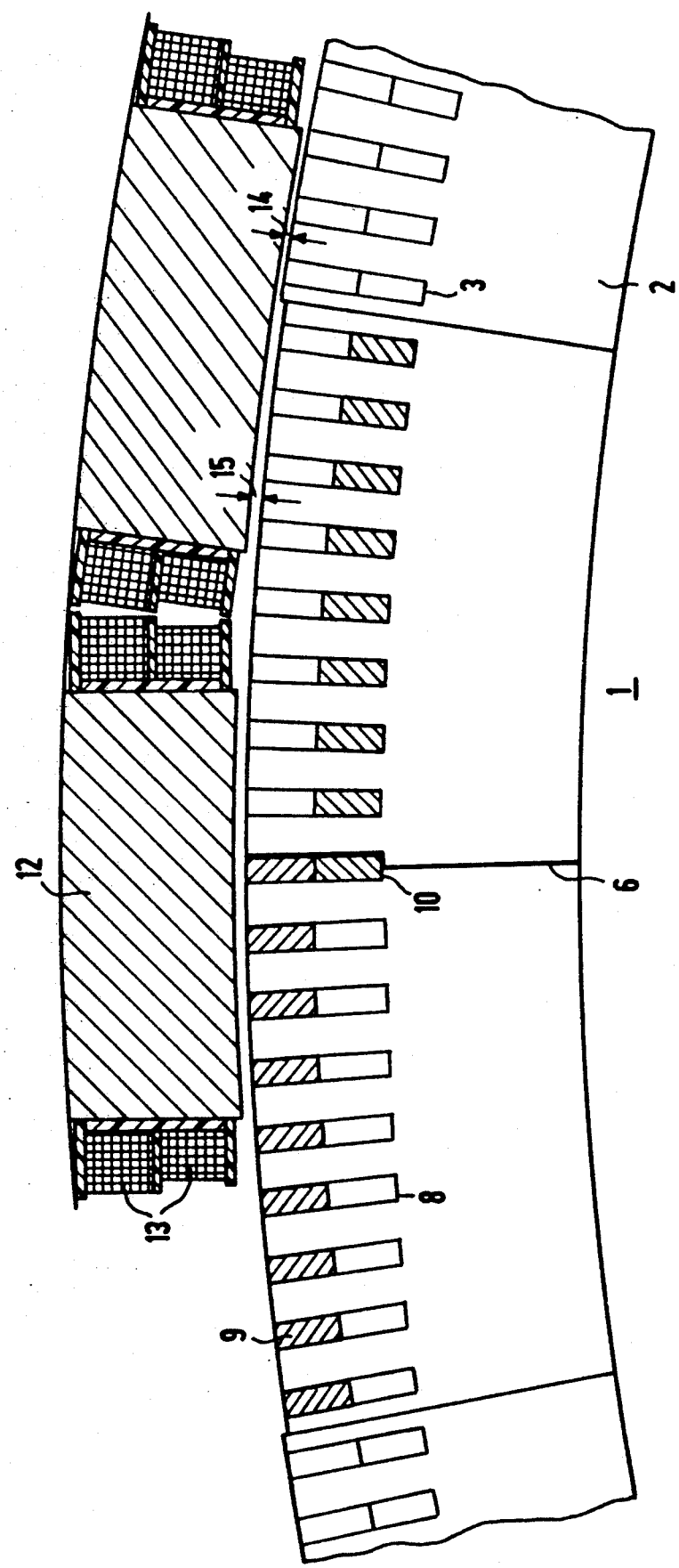
FIG. 2 shows a part of a radial cross-section through the stator armature stampings and the rotor of this a.c. motor.

Consequently, the grooves 3 adjacent to the joint 6 are only covered in one layer with one winding side 8. Such grooves are shown filled out with black in FIG. 2. The remaining free space in these grooves 3 is filled by a filler piece 9 to mechanically hold the winding sides 8 arranged in one layer. The groove 10 lying exactly on the joint 6 is filled with filler pieces 9.

The switching connections 11 are arranged at the frontal ends of the stator 1 and extend over the circumference of the stator and correspond to the structure of the stator coils. These switching connections switch the individual windings 4 in parallel and in series multiple times. Only the switching connections are passed over the joint. These switching connections have releasing connections there such that they can be joined together again at the installation site of the machine.

The rotor of the a.c. motor of synchronous design is arranged outside of the stator. The rotor carries several poles 12 with a solid structure. Each pole carries exciter coils 13. The air gap 14 indicated with arrows in FIG. 2 between the poles 12 and the sheetmetal segments 2 in the area of the grooves 3 filled with two layers of the winding sides 8, has a normal height resulting from the sizing of the a.c. motor. However, there is a larger air gap 15, also indicated with arrows, in the area of the grooves 3 occupied only halfway with one winding side 8, located adjacent to the joint 6. As a result, the armature reaction lacking in this area adjacent to the joint 6 since the grooves 3 are only filled with one layer, is optimized with regard to the effect of the magnetic force waves.

I claim:

1. A large diameter a.c. motor comprising:
   a stator including a plurality of stator joints,
   a stator coil, divided into a plurality of zones corresponding in number to said plurality of stator joints, each of said zones having closed windings;
   a plurality of grooves formed in the stator such that a first plurality of grooves in an area adjacent to, but not exactly on, any one of said joints are each occupied with only one winding side and a second plurality of grooves not exactly on any one of said plurality of stator joints are filled with two layers of winding sides; and
   wherein a rotor is disposed adjacent to the stator such that an air gap is formed, said air gap having a plurality of sizes.
   wherein, in an area of the stator having said first plurality of grooves, the air gap has a first size and in an area of the stator having said second plurality of grooves, the air gap has second size, said second size being smaller than said first size.

2. The a.c. motor of claim 1 wherein a size of the air gap in an area adjacent a central portion of the stator between two adjacent stator joints is greater than a size of the air gap adjacent to either of the two adjacent stator joints, with said air gap decreasing in size in a direction toward said central portion.

3. The a.c. motor according to claim 1, wherein, in those grooves occupied with only one winding side, portions of the grooves not occupied by the winding side are filled with filler pieces.

4. The a.c. motor according to claim 1, wherein the stator coil of the a.c. motor receives a current of variable frequency.

5. The a.c. motor according to claim 1 wherein the a.c. motor comprises an external rotor motor with said stator located on an inside of the rotor.

6. The a.c. motor according to claim 1, wherein any groove lying exactly on any one of said plurality of stator joints is filled with filler pieces.

7. A large diameter a.c. motor comprising:
   a) a stator, said stator including a plurality of stator joints;
   b) a rotor, said rotor being disposed adjacent to said stator such that an air gap is formed between said stator and said rotor, said air gap having a plurality of sizes;
   c) a stator coil, said stator coil being divided into a plurality of zones corresponding in number to said plurality of stator joints, each of said zones having closed windings;
   d) a plurality of switching connections, said switching connections extending over a circumference of said stator; and
   e) a plurality of grooves formed in the stator including a first plurality of grooves in an area adjacent to, but not exactly on, any one of said joints, each of said first plurality of grooves being occupies by only one winding side and a second plurality of grooves not exactly on any one of said plurality of stator joints, each of said second plurality of grooves being occupied by two layers of winding sides, wherein, in an area of said stator having said first plurality of grooves, the air gap has a first size, and in an area of said stator having said second plurality of grooves, the air gap has a second size, said second size being smaller than said first size.

* * * * *